US011287700B2

(12) United States Patent
Kwon et al.

(10) Patent No.: US 11,287,700 B2
(45) Date of Patent: *Mar. 29, 2022

(54) POLYMER FOR LIQUID CRYSTAL ALIGNMENT AGENT, LIQUID CRYSTAL ALIGNMENT AGENT COMPRISING THE SAME, AND LIQUID CRYSTAL ALIGNMENT FILM AND LIQUID CRYSTAL DISPLAY DEVICE USING THE SAME

(71) Applicant: LG CHEM, LTD., Seoul (KR)

(72) Inventors: Soon Ho Kwon, Daejeon (KR); Jung Ho Jo, Daejeon (KR); Sung Joon Min, Daejeon (KR); Sang Mi Lee, Daejeon (KR); Kichul Koo, Daejeon (KR); Jun Young Yoon, Daejeon (KR); Hyeong Seuk Yun, Daejeon (KR); Yoon Bin Lim, Daejeon (KR); Seongku Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 209 days.

This patent is subject to a terminal disclaimer.

(21) Appl. No.: 16/488,203

(22) PCT Filed: May 14, 2018

(86) PCT No.: PCT/KR2018/005505
§ 371 (c)(1),
(2) Date: Aug. 22, 2019

(87) PCT Pub. No.: WO2018/216939
PCT Pub. Date: Nov. 29, 2018

(65) Prior Publication Data
US 2021/0139780 A1    May 13, 2021

(30) Foreign Application Priority Data

May 22, 2017   (KR) .................. 10-2017-0063088
Nov. 13, 2017  (KR) .................. 10-2017-0150898

(51) Int. Cl.
*G02F 1/1337* (2006.01)
*C08G 73/10* (2006.01)
*C09K 19/56* (2006.01)

(52) U.S. Cl.
CPC ... *G02F 1/133723* (2013.01); *C08G 73/1042* (2013.01); *C08G 73/1067* (2013.01); *C08G 73/1078* (2013.01); *C08G 73/1085* (2013.01); *C09K 19/56* (2013.01); *C09K 2323/025* (2020.08); *C09K 2323/027* (2020.08)

(58) Field of Classification Search
CPC ........ G02F 1/133723; G02F 1/133719; C09K 2323/025; C09K 2323/027; C09K 19/56; C08G 73/1042; C08G 73/1067; C08G 73/1085; C08G 73/105; C08G 73/1071; C08G 73/1007
See application file for complete search history.

(56) References Cited

U.S. PATENT DOCUMENTS

| 6,013,760 | A | 1/2000 | Choi et al. | |
| 10,982,147 | B2 * | 4/2021 | Kim ........................ | C08J 5/18 |
| 2002/0133005 | A1 | 9/2002 | Iino et al. | |
| 2005/0188480 | A1 | 9/2005 | Lim et al. | |
| 2007/0112134 | A1 | 5/2007 | Seto | |
| 2008/0113889 | A1 | 5/2008 | Ruhe et al. | |
| 2014/0255710 | A1 | 9/2014 | Oishi et al. | |
| 2015/0045481 | A1 | 2/2015 | Kim et al. | |
| 2018/0028242 | A1 | 2/2018 | Parekh et al. | |

FOREIGN PATENT DOCUMENTS

| CN | 102604653 A | 7/2012 |
| CN | 105348180 A | 2/2016 |
| CN | 106479518 A | 3/2017 |
| EP | 3196228 A1 | 7/2017 |
| JP | 4609691 B2 | 1/2011 |
| JP | 2012-150251 A | 8/2012 |
| JP | 2015-040950 A | 3/2015 |
| JP | 2015-215591 A | 12/2015 |
| JP | 2015215591 A * | 12/2015 |
| JP | 2017-088801 A | 5/2017 |
| JP | 6962518 B2 * | 11/2021 |
| KR | 10-2008-0063148 A | 7/2008 |
| KR | 10-2008-0073235 A | 8/2008 |
| KR | 10-2011-0055384 A | 5/2011 |
| KR | 10-2011-0088394 A | 8/2011 |
| KR | 10-2012-0084253 A | 7/2012 |
| KR | 10-2013-0079141 A | 7/2013 |

(Continued)

OTHER PUBLICATIONS

International Search Report & Written Opinion issued for International Application No. PCT/KR2018/005505 dated Nov. 9, 2018, 10 pages.

Guan, Y. etc., "Highly refractive polyimides containing pyridine and sulfur units: synthesis and thermal, mechanical, solubility and optical properties", Polymer International, Apr. 3, 2017, 66, pp. 1044-1054.

Jong-Mo Jung and Doo-Kyang Yang, "Structural Analysis of Polyimide: Hydrolysis and Reaction-type Pyrolysis Application", Polymer Science and Technology vol. 16, No. 1, Feb. 2005, along with English abstract, 9 pages.

International Search Report & Written Opinion issued for International Application No. PCT/KR2018/009404 dated Jan. 17, 2019, 10 pages.

(Continued)

*Primary Examiner* — Sophie Hon
(74) *Attorney, Agent, or Firm* — Rothwell, Figg, Ernst & Manbeck, P.C.

(57) ABSTRACT

The present invention relates to a polymer having excellent liquid crystal alignment and electrical properties and thus is suitable for use as a liquid crystal alignment agent, a liquid crystal alignment agent containing the same, a liquid crystal aligning film formed from the liquid crystal alignment agent, and a liquid crystal display device containing the liquid crystal aligning film.

8 Claims, No Drawings

(56) References Cited

FOREIGN PATENT DOCUMENTS

| KR | 10-2013-0103023 | A | | 9/2013 |
|----|-----------------|---|---|--------|
| KR | 10-2014-0027550 | A | | 3/2014 |
| KR | 10-2014-0051405 | A | | 4/2014 |
| KR | 10-2016-0140825 | A | | 12/2016 |
| KR | 10-2017-0030045 | A | | 3/2017 |
| KR | 10-2019-0021977 | A | | 3/2019 |
| KR | 102162502 | B2 | * | 10/2020 |
| TW | 201231505 | A | | 8/2012 |
| TW | 201837082 | A | | 10/2018 |
| TW | 1714849 | B | * | 1/2021 |
| WO | 2017-043822 | A1 | | 3/2017 |

OTHER PUBLICATIONS

Kurita et al., "Heat-Resistant Polymers Containing Bipyridyl Units. I. Polyimides," Journal of Polymer Science, Polymer Chemistry Edition, 1973, vol. 11, pp. 3125-3150.

* cited by examiner

POLYMER FOR LIQUID CRYSTAL ALIGNMENT AGENT, LIQUID CRYSTAL ALIGNMENT AGENT COMPRISING THE SAME, AND LIQUID CRYSTAL ALIGNMENT FILM AND LIQUID CRYSTAL DISPLAY DEVICE USING THE SAME

CROSS-REFERENCE TO RELATED APPLICATION(S)

This application is a 35 U.S.C. § 371 National Phase Entry Application from PCT/KR2018/005505, filed on May 14, 2018, and designating the United States, which claims the benefit of priority from Korean Patent Application No. 10-2017-0063088 filed on May 22, 2017 and Korean Patent Application No. 10-2017-0150898 filed on Nov. 13, 2017 with the Korean Intellectual Property Office, the disclosures of which are incorporated herein by reference in their entirety.

The present invention relates to a polymer having excellent liquid crystal alignment and electrical properties and thus is suitable for use as a liquid crystal alignment agent, a liquid crystal alignment agent containing the same, a liquid crystal alignment film formed from the liquid crystal alignment agent, and a liquid crystal display device containing the liquid crystal alignment film.

TECHNICAL FIELD

Background Art

In order to obtain uniform brightness and a high contrast ratio in a liquid crystal display device, it is essential for the liquid crystals to be uniformly aligned. The liquid crystal alignment agent serves as a director in the arrangement of liquid crystal molecules, and thus, when the liquid crystals move by an electric field to form an image, it helps them take an appropriate direction.

Polyimide, polyamide, polyester, and the like are widely known as conventional liquid crystal alignment agents. Among them, particularly, polyimide is excellent in heat resistance, affinity with liquid crystal, mechanical strength, etc., and therefore is used for many liquid crystal display devices.

However, in recent years, as the demand for a lower power display increases, it has been found that the liquid crystal alignment agent can affect not only the basic properties such as the alignment property of the liquid crystal but also the electrical properties such as an afterimage generated by the direct current/alternating voltage, and the voltage holding ratio. Thus, there is a growing need for the development of a liquid crystal alignment material capable of simultaneously realizing excellent liquid crystal alignment and electrical properties.

For this purpose, various attempts have been made to change the structure itself of the liquid crystal alignment agent, through a method of changing monomers used for the production of the liquid crystal alignment agent or of combining a plurality of different monomers, thereby improving the physical/chemical properties thereof. However, these attempts have not yet reached a dramatic improvement in physical properties.

Therefore, there is a need to develop a novel liquid crystal alignment agent having excellent liquid crystal alignment and electrical properties.

DETAILED DESCRIPTION OF THE INVENTION

Technical Problem

It is one object of the present invention to provide a polymer having excellent liquid crystal alignment and electrical properties and thus is suitable for use as a liquid crystal alignment agent.

It is another object of the present invention to provide a liquid crystal alignment agent, a liquid crystal alignment film, and a liquid crystal display device using the above-described polymer for a liquid crystal alignment agent.

Technical Solution

The present invention provides a polymer for a liquid crystal alignment agent including one or more repeating units selected from the group consisting of a repeating unit represented by the following Chemical Formula 1, a repeating unit represented by the following Chemical Formula 2, and a repeating unit represented by the following Chemical Formula 3.

[Chemical Formula 1]

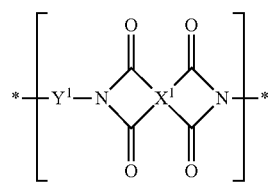

[Chemical Formula 2]

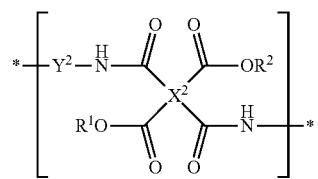

[Chemical Formula 3]

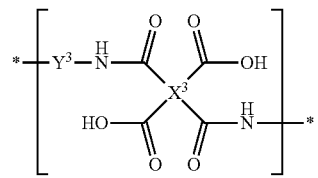

In Chemical Formulas 1 to 3, at least one of $R^1$ and $R^2$ is an alkyl group having 1 to 10 carbon atoms and the other is hydrogen, $X^1$ to $X^3$ are each independently a tetravalent organic group, and $Y^1$ to $Y^3$ are each independently a divalent organic group represented by the following Chemical Formula 4.

[Chemical Formula 4]

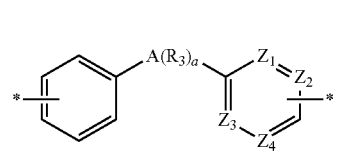

In Chemical Formula 4, A is a Group 15 element, $R_3$ is hydrogen or an alkyl group having 1 to 10 carbon atoms, a is an integer of 1 to 3, and at least one of $Z_1$ to $Z_4$ is nitrogen and the rest are carbon.

Hereinafter, a polymer for a liquid crystal alignment agent according to a specific embodiment of the present invention and a method for producing the same will be described in detail.

Throughout the specification, when one part "includes" one constituent element, unless otherwise specifically described, this does not mean that another constituent element is excluded, but means that another constituent element may be further included.

As used herein, the term "substituted" means that a hydrogen atom bonded to a carbon atom in a compound is changed to another substituent, and a position to be substituted is not limited as long as the position is a position at which the hydrogen atom is substituted, that is, a position at which the substituent may be substituted, and when two or more are substituted, the two or more substituents may be the same as or different from each other.

As used herein, the term "substituted or unsubstituted" means that substitution is performed by one or more substituent groups selected from the group consisting of: deuterium; a halogen group; a cyano group; a nitro group; a hydroxyl group; a carbonyl group; an ester group; an imide group; an amide group; an amino group; a carboxy group; a sulfonic acid group; a sulfonamide group; a phosphine oxide group; an alkoxy group; an aryloxy group; an alkylthioxy group; an arylthioxy group; an alkylsulfoxy group; an arylsulfoxy group; a silyl group; a boron group; an alkyl group; a cycloalkyl group; an alkenyl group; an aryl group; an aralkyl group; an aralkenyl group; an alkylaryl group; an arylphosphine group; or a heterocyclic group containing at least one of N, O, and S atoms, or there is no substituent group, or substitution is performed by a substituent group where two or more substituent groups of the exemplified substituent groups are linked or there is no substituent group. For example, the term "substituent group where two or more substituent groups are linked" may refer to a biphenyl group. That is, the biphenyl group may be an aryl group, or may be interpreted as a substituent group where two phenyl groups are connected.

In the present specification, ⊢ or ⸺* means a bond connected to another substituent group, and a direct bond means a case where another atom does not exist in a portion represented by L.

In the present specification, the alkyl group may be straight-chained or branched, and the number of carbon atoms thereof is not particularly limited, but is preferably 1 to 10. According to another embodiment, the alkyl group has 1 to 6 carbon atoms. Specific examples of the alkyl group include methyl, ethyl, propyl, n-propyl, isopropyl, butyl, n-butyl, isobutyl, tert-butyl, sec-butyl, 1-methyl-butyl, 1-ethylbutyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cycloheptylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, and the like, but are not limited thereto.

The fluoroalkyl group having 1 to 10 carbon atoms may be one in which at least one hydrogen atom in an alkyl group having 1 to 10 carbon atoms is substituted with fluorine, and the fluoroalkoxy group having 1 to 10 carbon atoms may be one in which at least one hydrogen atom in an alkoxy group having 1 to 10 carbon atoms is substituted with fluorine.

The halogen group may be fluorine (F), chlorine (Cl), bromine (Br), or iodine (I).

The Group 15 element may be nitrogen (N), phosphorus (P), arsenic (As), antimony (Sb), or bismuth (Bi).

The nitrogen oxide is a compound in which a nitrogen atom and an oxygen atom are bonded, and the nitrogen oxide functional group means a functional group containing a nitrogen oxide in the functional group. Examples of the nitrogen oxide functional group include a nitro group (—NO$_2$) and the like.

The present inventors found through experiments that, when using a polymer for a liquid crystal alignment agent including repeating units of Chemical Formulas 1 to 3 prepared from a reaction product containing a nitrogen atom-containing diamine compound having a specific structure, it is possible to have a high voltage holding ratio at a high temperature and to improve a reduction in contrast ratio or an afterimage phenomenon, thereby completing the present invention.

According to one embodiment of the invention, a polymer for a liquid crystal alignment agent including one or more repeating units selected from the group consisting of a repeating unit represented by Chemical Formula 1, a repeating unit represented by Chemical Formula 2, and a repeating unit represented by Chemical Formula 3 may be provided.

Specifically, the polymer according to one embodiment includes repeating units of Chemical Formulas 1 to 3. In the repeating units of Chemical Formulas 1 to 3, $X^1$ to $X^3$ may be various tetravalent organic groups as described above, and $Y^1$ to $Y^3$ may be various divalent organic groups as described above.

The $Y^1$ to $Y^3$ may be defined as divalent organic groups represented by Chemical Formula 4 to provide a polymer for a liquid crystal alignment agent having various structures capable of exhibiting the above-mentioned effects.

[Chemical Formula 4]

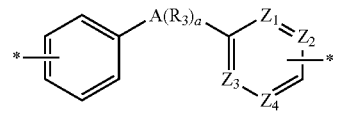

In Chemical Formula 4, A is a Group 15 element, $R_3$ is hydrogen or an alkyl group having 1 to 10 carbon atoms, a is an integer of 1 to 3, and at least one of $Z_1$ to $Z_4$ is nitrogen and the rest are carbon.

The Group 15 element may be nitrogen (N), phosphorus (P), arsenic (As), antimony (Sb), or bismuth (Bi). The $R_3$ is a functional group bonded to the A, and can be bonded to the A element by a number represented by a. Preferably, in Chemical Formula 4, A is nitrogen, $R_3$ is hydrogen, and a may be 1.

On the other hand, by satisfying the condition that in Chemical Formula 4 at least one of $Z_1$ to $Z_4$ is nitrogen and the rest are carbon, Chemical Formula 4 may form an asymmetric structure which does not form symmetry with respect to the center point or the center line due to the nitrogen atom. Chemical Formula 4 is a repeating unit derived from a diamine, which is a precursor used for the formation of a polymer for a liquid crystal alignment agent, and this is considered to be due to the use of an asymmetric diamine as described later.

In the field of polymers for liquid crystal alignment agents conventionally known in the art, from the viewpoint of not recognizing the constitution of the asymmetric diamine or the repeating unit derived therefrom, and effects resulting therefrom at all, the repeating unit of Chemical Formula 4 and its precursor, the diamine compound, are considered to be novel.

More specifically, in Chemical Formula 4, one of $Z_1$ to $Z_4$ may be nitrogen and the rest may be carbon. In Chemical Formula 4, one of $Z_1$ and $Z_3$ is nitrogen and the other is carbon, and $Z_2$ and $Z_4$ may be carbon. That is, the aromatic ring containing $Z_1$ to $Z_4$ in Chemical Formula 4 may have a pyridine structure. Accordingly, the liquid crystal display device to which the polymer for a liquid crystal alignment agent of one embodiment is applied can realize a high voltage holding ratio and liquid crystal alignment property.

On the other hand, when two aromatic cyclic compounds are bonded through a single bond without a secondary amine group or a tertiary amine group, technical problems that the illuminance fluctuation rate of the liquid crystal alignment agent is increased, the afterimage property is poor, and the voltage holding ratio is remarkably reduced, are caused.

Further, in the case where neither of the two aromatic cyclic compounds bonded through a secondary amine group or a tertiary amine group contain a nitrogen atom, even if the imidization reaction of the polyamic acid or the polyamic acid ester formed by the reaction of the amine and the acid anhydride proceeds, a sufficient imidization reaction (e.g., via a 230° C. heat treatment) does not proceed, and thus there is a limitation that the imidization rate decreases within the final liquid crystal alignment film.

Further, the functional group represented by Chemical Formula 4 is characterized in that only the amine group and hydrogen are bonded to each of two aromatic cyclic compounds, preferably the heteroaromatic cyclic compound and the aromatic cyclic compound, and other substituents are not introduced. When a substituent such as a fluoroalkyl group is introduced into the heteroaromatic cyclic compound or the aromatic cyclic compound, technical problems that the luminance fluctuation rate is increased, the afterimage property is poor, and the voltage holding ratio is remarkably reduced, may be caused.

In addition, Chemical Formula 4 may include at least one functional group selected from the group consisting of the following Chemical Formulas 4-1, 4-2, and 4-3.

[Chemical Formula 4-1]

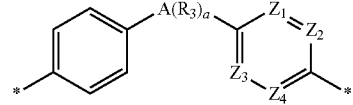

[Chemical Formula 4-2]

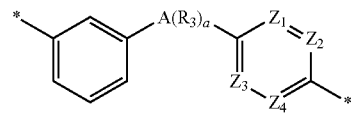

[Chemical Formula 4-3]

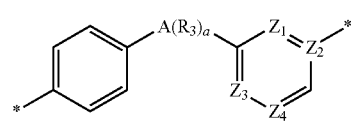

In Chemical Formulas 4-1, 4-2, and 4-3, A, $R_3$, a, $Z_1$, $Z_2$, $Z_3$, and $Z_4$ are as defined above with reference to Chemical Formula 4.

As described above, as the repeating unit of Chemical Formula 4 includes one or more functional groups selected from the group consisting of Chemical Formulas 4-1, Chemical Formulas 4-2, and Chemical Formulas 4-3, an excellent liquid crystal alignment property can be realized.

On the other hand, the $X^1$ to $X^3$ may each independently include a tetravalent organic group represented by the following Chemical Formula 5. That is, the $X^1$ to $X^3$ may each independently correspond to any one of the tetravalent organic groups represented by the following Chemical Formula 5.

[Chemical Formula 5]

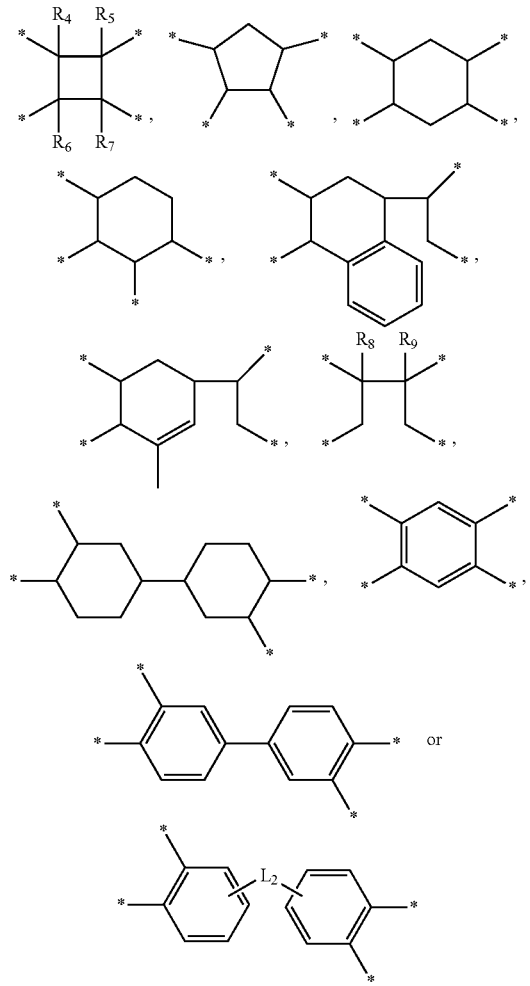

In Chemical Formula 5, $R_4$ to $R_9$ are each independently hydrogen or an alkyl group having 1 to 10 carbon atoms, $L_2$ is any one selected from the group consisting of a direct bond, —O—, —CO—, —S—, —SO—, —SO$_2$—, —CR$_{10}$R$_{11}$—, —CONH—, —COO—, —(C$_2$)$_b$—, —O(CH$_2$)$_b$O—, —COO—(CH$_2$)$_b$—OCO—, phenylene, or a combination thereof, $R_{10}$ and $R_{11}$ are each independently hydrogen, an alkyl group having 1 to 10 carbon atoms, or a fluoroalkyl group having 1 to 10 carbon atoms, and b is an integer of 1 to 10.

More preferably, the $X^1$ to $X^3$ may each independently be: an organic group of the following Chemical Formula 5-1 derived from pyromellitic dianhydride (PMDA); an organic group of the following Chemical Formula 5-2 derived from 3,3',4,4'-biphenyl tetracarboxylic acid dianhydride (BPDA); an organic group of the following Chemical Formula 5-3 derived from 1,2,4,5-cyclohexanetetracarboxylic dianhydride (HPMDA); or an organic group of the following Chemical Formula 5-4 derived from 1,3-dimethyl-cyclobutane-1,2,3,4-tetracarboxylic acid dianhydride (DMCBDA).

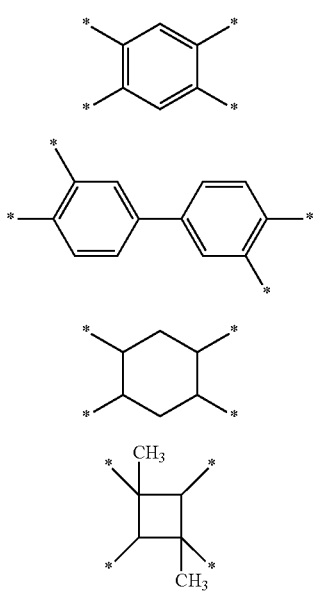

[Chemical Formula 5-1]

[Chemical Formula 5-2]

[Chemical Formula 5-3]

[Chemical Formula 5-4]

Among the repeating units represented by Chemical Formula 1, Chemical Formula 2, and Chemical Formula 3, the polymer may include the repeating unit represented by Chemical Formula 1, which is an imide repeating unit, in an amount of 0 mol % to 80 mol %, preferably 0.1 mol % to 65 mol %, based on the total repeating units.

As described above, when the polymer including a specific amount of the imide repeating unit represented by Chemical Formula 1 is used, the polymer includes a certain amount of already imidized imide repeating units, and thus a liquid crystal alignment film having an excellent alignment property and stability can be prepared even when the high-temperature heat treatment process is omitted and light is directly irradiated.

If the repeating unit represented by Chemical Formula 1 is included at less than the above-mentioned content range, sufficient alignment properties may not be exhibited and alignment stability may be deteriorated. If the content of the repeating unit represented by Chemical Formula 1 exceeds the above-mentioned content range, a problem that the solubility is lowered and thus it is difficult to prepare a stable alignment solution capable of coating may be caused. Accordingly, it is preferable to include the repeating unit represented by Chemical Formula 1 within the above-mentioned content range, because it can provide a polymer for a liquid crystal alignment agent having excellent storage stability, electrical properties, alignment properties, and alignment stability.

Further, the repeating unit represented by Chemical Formula 2 or the repeating unit represented by Chemical Formula 3 may be included in an appropriate amount depending on the desired properties.

Specifically, the repeating unit represented by Chemical Formula 2 may be included in an amount of 0 mol % to 50 mol %, preferably 0.1 mol % to 30 mol %, based on the total repeating units represented by Chemical Formulas 1 to 3. The repeating unit represented by Chemical Formula 2 has a low rate of conversion to imide during a high-temperature heat treatment process after light irradiation, and thus, if the amount exceeds the above range, the overall imidization rate is insufficient, thereby deteriorating the alignment stability. Accordingly, the repeating unit represented by Chemical Formula 2 exhibits appropriate solubility within the above-mentioned range and thus can provide a polymer for a liquid crystal alignment agent which can implement a high imidization rate, while having excellent processing properties.

Furthermore, the repeating unit represented by Chemical Formula 3 may be included in an amount of 10 mol % to 100 mol %, preferably 30 mol % to 99.8 mol %, based on the total repeating units represented by Chemical Formulas 1 to 3. Within such a range, excellent coating properties can be exhibited, thereby providing a polymer for a liquid crystal alignment agent which can implement a high imidization rate, while having excellent processing properties.

Meanwhile, the polymer for a liquid crystal alignment agent of one embodiment may further include one or more repeating units selected from the group consisting of a repeating unit represented by the following Chemical Formula 11, a repeating unit represented by the following Chemical Formula 12, and a repeating unit represented by the following Chemical Formula 13.

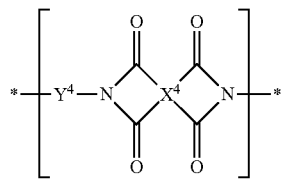

[Chemical Formula 11]

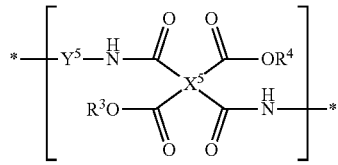

[Chemical Formula 12]

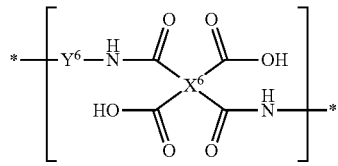

[Chemical Formula 13]

In Chemical Formulas 11 to 13, at least one of $R^3$ and $R^4$ is an alkyl group having 1 to 10 carbon atoms and the other is hydrogen, $X^4$ to $X^6$ are each independently a tetravalent organic group, and $Y^4$ to $Y^6$ are each independently a divalent organic group represented by the following Chemical Formula 14,

[Chemical Formula 14]

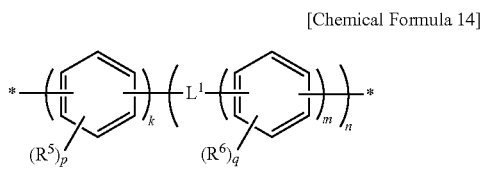

wherein, in Chemical Formula 14, $R^5$ and $R^6$ are each independently hydrogen, a halogen, a cyano, a $C_{1-10}$ alkyl, a $C_{2-10}$ alkenyl, a $C_{1-10}$ alkoxy, a $C_{1-10}$ fluoroalkyl, or a $C_{1-10}$ fluoroalkoxy, p and q are each independently an integer of 0 to 4, $L^1$ is a single bond, —O—, —CO—, —S—, —SO$_2$—, —C(CH$_3$)$_2$—, —C(CF$_3$)$_2$—, —CONH—, —COO—, —(CH$_2$)$_z$—, —O(CH$_2$)$_z$O—, —O(CH$_2$)$_z$—, —NH—, —NH(CH$_2$)$_z$—NH—, —NH(CH$_2$)$_z$O—, —OCH$_2$—C(CH$_3$)$_2$—CH$_2$O—, —COO—(CH$_2$)$_z$—OCO—, or —OCO—(CH$_2$)$_z$—COO—, Z is an integer of 1 to 10, k and m are each independently an integer of 0 to 3, or 1 to 3, and n is an integer of 0 to 3.

In Chemical Formula 14, hydrogen can be bonded to carbon which is not substituted by $R^5$ or $R^6$, p and q are each independently an integer of 0 to 4, 1 to 4, or 2 to 4, and when p or q is an integer of 2 to 4, a plurality of $R^5$ or $R^6$ may be the same or different substituents.

Further, in Chemical Formula 14, k and m may each independently be an integer of 0 to 3, or 1 to 3, and n may be an integer of 0 to 3, or 1 to 3.

More specifically, Chemical Formula 14 may be the following Chemical Formula 15 or the following Chemical Formula 16.

[Chemical Formula 15]

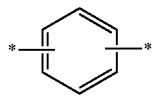

[Chemical Formula 16]

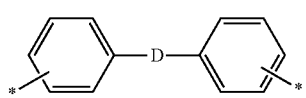

In Chemical Formula 16, D is a direct bond, —O—, —SO$_2$—, or —C(R$_7$)(R$_8$)—, wherein $R_7$ and $R_8$ are each independently hydrogen or an alkyl group having 1 to 10 carbon atoms.

Preferably, Chemical Formula 15 may be the following Chemical Formula 17.

[Chemical Formula 17]

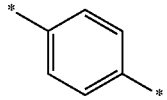

Further, Chemical Formula 16 may be the following Chemical Formula 18.

[Chemical Formula 18]

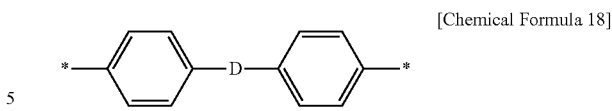

In Chemical Formula 18, D is —O— or —CH$_2$—.

The $X^4$ to $X^6$ may each independently include a tetravalent organic group represented by the following Chemical Formula 5.

[Chemical Formula 5]

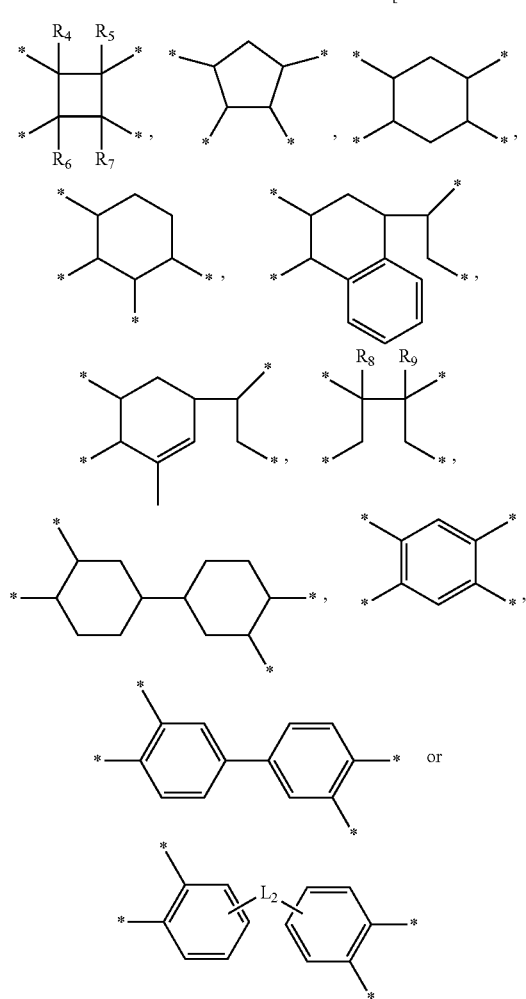

In Chemical Formula 5, $R_9$ to $R_{14}$ are each independently hydrogen or an alkyl group having 1 to 10 carbon atoms, $L_2$ is any one selected from the group consisting of a direct bond, —O—, —CO—, —S—, —SO—, —SO$_2$—, —CR$_{15}$R$_{16}$—, —CONH—, —COO—, —(CH$_2$)$_b$—, —O(CH$_2$)$_b$O—, —COO—(CH$_2$)$_b$—OCO—, phenylene, or a combination thereof, $R_{15}$ and $R_{16}$ are each independently an alkyl group having 1 to 10 carbon atoms or a fluoroalkyl group having 1 to 10 carbon atoms, and b is an integer of 1 to 10.

At this time, the molar ratio between one or more repeating units selected from the group consisting of the repeating unit represented by Chemical Formula 1, the repeating unit represented by Chemical Formula 2, and the repeating unit represented by Chemical Formula 3, and one or more repeating units selected from the group consisting of the repeating unit represented by Chemical Formula 11, the repeating unit represented by Chemical Formula 12, and the repeating unit represented by Chemical Formula 13 may be 1:100 to 100:1.

Further, the polymer for a liquid crystal alignment agent of the one embodiment may further include one or more repeating units selected from the group consisting of a repeating unit represented by Chemical Formula 21, a repeating unit represented by Chemical Formula 22, and a repeating unit represented by Chemical Formula 23.

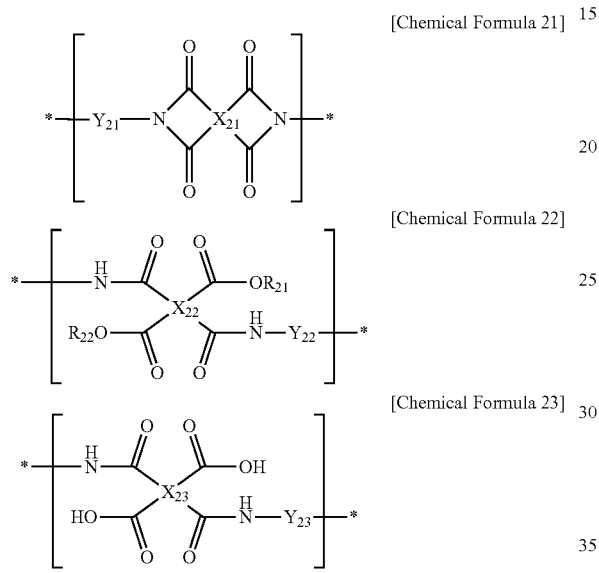

[Chemical Formula 21]

[Chemical Formula 22]

[Chemical Formula 23]

In Chemical Formulas 21 to 23, at least one of $R_{21}$ and $R_{22}$ is an alkyl group having 1 to 10 carbon atoms and the other is hydrogen, $X_{21}$ to $X_{23}$ are different from $X^1$ to $X^3$ in Chemical Formulas 1 to 3, or are different from $X^4$ to $X^6$ in Chemical Formulas 11 to 13, or are different from $X^1$ to $X^3$ in Chemical Formulas 1 to 3 and $X^4$ to $X^6$ in Chemical Formulas 11 to 13, and are each independently a tetravalent organic group represented by Chemical Formula 5, while $Y_{21}$ to $Y_{23}$ are each independently a divalent organic group represented by Chemical Formula 4 or a divalent organic group represented by Chemical Formula 14.

The polymer for a liquid crystal alignment agent may have a weight average molecular weight of 1000 g/mol to 200,000 g/mol. The weight average molecular weight means a weight average molecular weight in terms of polystyrene measured by a GPC method. In the process of determining the weight average molecular weight in terms of polystyrene measured by the GPC method, a commonly known analyzing device, a detector such as a refractive index detector, and an analytical column can be used. Commonly applied conditions for temperature, solvent, and flow rate can be used. Specific examples of the measurement conditions include a temperature of 30° C., a chloroform solvent, and a flow rate of 1 mL/min.

Such a polymer can be used as a liquid crystal alignment agent to provide a liquid crystal alignment film which realizes excellent stability and reliability.

Examples of the method for producing the polymer for a liquid crystal alignment agent are not particularly limited. For example, a method for producing the polymer for a liquid crystal alignment agent including the steps of: producing a compound represented by the following Chemical Formula 8 by reacting a heteroaromatic compound represented by the following Chemical Formula 6 with an aromatic compound represented by the following Chemical Formula 7; producing a diamine of Chemical Formula 9 by reducing the compound of Chemical Formula 8; reacting the diamine of Chemical Formula 9 with a tetracarboxylic acid or an anhydride thereof; and imidizing the reaction product with the tetracarboxylic acid or a anhydride thereof can be used.

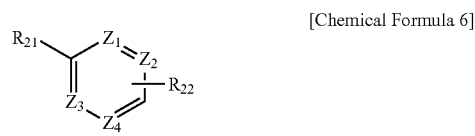

[Chemical Formula 6]

In Chemical Formula 6, $R_{21}$ is a halogen element, $R_{22}$ is a nitrogen oxide functional group,
at least one of $Z_1$ to $Z_4$ is nitrogen, and the rest are hydrogen.

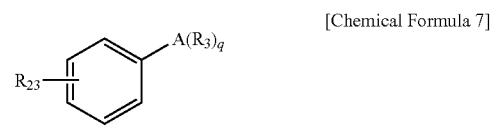

[Chemical Formula 7]

In Chemical Formula 7, A is a Group 15 element, $R_3$ is hydrogen or an alkyl group having 1 to 10 carbon atoms, q is an integer of 2 to 4, and $R_{23}$ is an amino group or a nitrogen oxide functional group.

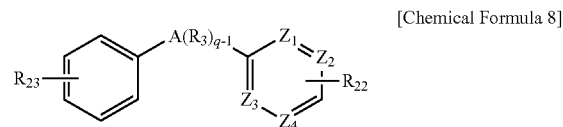

[Chemical Formula 8]

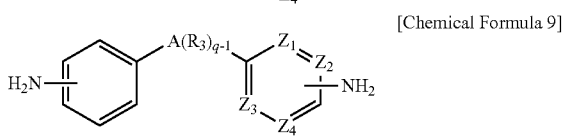

[Chemical Formula 9]

Preferably, in Chemical Formula 6, $R_{21}$ is a chlorine atom, $R_{22}$ is a nitro group,
one of $Z_1$ and $Z_3$ is nitrogen and the other is carbon, and $Z_2$ and $Z_4$ may be carbon. That is, preferred examples of Chemical Formula 6 include 2-chloro-5-nitropyridine, 2-chloro-4-nitropyridine, and the like.

Further, preferably, in Chemical Formula 7, A is a nitrogen element, $R_3$ is hydrogen, q is 2, and $R_{23}$ may be an amino group. That is, preferred examples of Chemical Formula 7 include paraphenylene diamine, metaphenylene diamine, and the like.

In the step of preparing the compound of Chemical Formula 8, the compound of Chemical Formula 8 can be produced through reaction of the heteroaromatic compound of Chemical Formula 6 with the aromatic compound of Chemical Formula 7. Specifically, the reaction in which the halogen element of $R_{21}$ contained in the heteroaromatic compound of Chemical Formula 6 is substituted with a Group 15 element of A contained in the aromatic compound of Chemical Formula 7 can proceed.

The reaction can proceed with a high yield of more than 50% under mild conditions in the presence of a tertiary amine catalyst at room temperature for 6 to 15 hours. The reaction may be carried out in the presence of various organic solvents conventionally known in the art. Specific examples of the organic solvent include ethyl acetate, tetrahydrofuran, N,N-dimethylformamide, N,N-dimethylacetamide, N-methyl-2-pyrrolidone, N-methyl caprolactam, 2-pyrrolidone, N-ethylpyrrolidone, N-vinyl pyrrolidone, dimethyl sulfoxide, tetramethylurea, pyridine, dimethylsulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, or the like. These solvents can be used alone or in combination of two or more.

In Chemical Formula 6, $R_{21}$ is a halogen element, $R_{22}$ is a nitrogen oxide functional group, and at least one of $Z_1$ to $Z_4$ is nitrogen and the rest may be carbon. More specifically, in Chemical Formula 6, one of $Z_1$ to $Z_4$ may be nitrogen and the rest may be carbon. In Chemical Formula 6, one of $Z_1$ and $Z_3$ is nitrogen and the other is carbon, and $Z_2$ and $Z_4$ may be carbon. Further, preferably, in Chemical Formula 6, $R_{21}$ may be chlorine and $R_{22}$ may be a nitro group.

In Chemical Formula 7, A is a Group 15 element, $R_3$ is hydrogen or an alkyl group having 1 to 10 carbon atoms, q is an integer of 2 to 4, and $R_{23}$ may be an amino group or a nitrogen oxide functional group. Preferably, in Chemical Formula 7, A is nitrogen, $R_3$ is hydrogen, q is 2, and $R_{23}$ is an amino group.

In the nitrogen oxide functional group, the nitrogen oxide is a compound in which a nitrogen atom and an oxygen atom are bonded, and the nitrogen oxide functional group means a functional group containing a nitrogen oxide in the functional group. Examples of the nitrogen oxide functional group include a nitro group ($—NO_2$) and the like.

The Group 15 element may be nitrogen (N), phosphorus (P), arsenic (As), antimony (Sb), or bismuth (Bi). The $R_3$ is a functional group which binds to the A, and can be bonded to the A element by a number represented by q.

The compound of Formula 8 thus produced can produce the diamine compound of Chemical Formula 9 through a reduction reaction. Specifically, as the nitrogen oxide functional group of $R_{22}$ contained in the compound of Chemical Formula 8 is reduced to a primary amino group under reducing conditions, a diamine compound can be synthesized.

The reduction reaction can proceed with a high yield of 80% or more under mild conditions in the presence of a palladium/carbon catalyst at room temperature for 10 to 15 hours. The reaction may proceed in the presence of various organic solvents conventionally known in the art. Specific examples of the organic solvent include ethyl acetate, tetrahydrofuran, N,N-dimethylformamide, N,N-dimethylacetamide, N-methyl-2-pyrrolidone, N-methyl caprolactam, 2-pyrrolidone, N-ethylpyrrolidone, N-vinyl pyrrolidone, dimethyl sulfoxide, tetramethylurea, pyridine, dimethylsulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methylnonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, or the like. These solvents can be used alone or in combination of two or more.

The contents of A, $R_3$, q, $Z_1$, $Z_2$, $Z_3$, $Z_4$, $R_{22}$, and $R_{23}$ defined in Chemical Formulas 8 and 9 include those described above with reference to Chemical Formulas 6 and 7.

The diamine of Chemical Formula 9 prepared through the above steps can be reacted with a tetracarboxylic acid or an anhydride thereof commonly used for the preparation of polyamic acids, for example, pyromellitic dianhydride (PMDA), 3,3',4,4'-biphenyl tetracarboxylic acid dianhydride (BPDA), 1,2,4,5-cyclohexanetetracarboxylic dianhydride (HPMDA), 1,3-dimethyl-cyclobutane-1,2,3,4-tetracarboxylic dianhydride (DMCBDA), or a mixture of two or more thereof to prepare a polymer composed of amic acid, amic acid ester, or a mixture thereof.

Alternatively, if necessary, in addition to the diamine of Chemical Formula 9 prepared through the above steps, various types of diamine compounds, which are widely known in the field generally associated with liquid crystal alignment agents, for example, p-phenylenediamine, 4,4-oxydianiline, 4,4'-methylenedianiline, or the like, can be mixed to prepare an amic acid, an amic acid ester, or a mixture thereof.

The reaction conditions can be appropriately adjusted with reference to the production conditions of polyamic acid known in the technical field to which the present invention belongs. Then, the obtained amic acid, amic acid ester, or a mixture thereof may be imidized to prepare a polymer having the repeating units of the above-mentioned Chemical Formulas 1 to 3.

On the other hand, according to another embodiment of the invention, a liquid crystal alignment agent including the polymer is provided.

Since the liquid crystal alignment agent includes the above-mentioned polymer, it can effectively suppress deterioration of the stability and reliability due to the decomposition reaction of the polymer during the baking process and storage, and exhibit excellent coating properties and simultaneously exhibit an excellent imide conversion ratio.

Such a liquid crystal alignment agent may be provided through a variety of methods known known in the technical field to which the present invention belongs, except that they include the above-mentioned polymer.

In a non-limiting example, the above-mentioned polymer may be dissolved or dispersed in an organic solvent to provide a liquid crystal alignment agent.

Specific examples of the organic solvent include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethyl sulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, and the like. These solvents can be used alone or in combination of two or more.

In addition, the liquid crystal alignment agent may further include other components in addition to the polymer and the organic solvent. In a non-limiting example, when the liquid crystal alignment agent has been coated, an additive capable of improving the uniformity of film thickness or the surface smoothness, improving adhesion between the liquid crystal alignment film and the substrate, changing the dielectric constant and conductivity of a liquid crystal alignment film, or increasing the denseness of the liquid crystal alignment film, may further be included. Such additive may be exemplified by a variety of solvents, surfactants, silane-based compounds, dielectric substances, crosslinkable compounds, etc.

On the other hand, according to another embodiment of the invention, a liquid crystal alignment film including the liquid crystal alignment agent as described above is provided.

The liquid crystal alignment film including the liquid crystal alignment agent means that the liquid crystal alignment film includes the liquid crystal alignment agent as it is or the liquid crystal alignment film includes a product (for example, a cured product) resulting from chemical reaction of the liquid crystal alignment agent.

The liquid crystal alignment film may be formed by a variety of methods known in the technical field to which the present invention pertains, except that the above-described liquid crystal alignment agent is used.

As an example, a method for producing a liquid crystal alignment film including the steps of: coating the above-mentioned liquid crystal alignment agent onto a substrate to form a coating film (step 1); drying the coating film (step 2); irradiating the coating film with light or rubbing the coating film immediately after the drying step to perform an alignment treatment (step 3); and heat-treating and curing the alignment-treated coating film (step 4) can be used.

The step 1 is a step of coating the above-described liquid crystal alignment agent onto a substrate to form a coating film.

The method of coating the liquid crystal alignment agent onto a substrate is not particularly limited, and for example, a method such as screen printing, offset printing, flexographic printing, inkjet, and the like can be used.

Furthermore, the liquid crystal alignment agent may be those which are dissolved or dispersed in an organic solvent. Specific examples of the organic solvent include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethyl sulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate, and the like. These solvents can be used alone or in combination of two or more.

In addition, the liquid crystal alignment agent may further include other components in addition to the organic solvent. In a non-limiting example, when the liquid crystal alignment agent has been coated, an additive capable of improving the uniformity of film thickness or the surface smoothness, improving adhesion between the liquid crystal alignment film and the substrate, changing the dielectric constant and conductivity of a liquid crystal alignment film, or increasing the denseness of the liquid crystal alignment film, may further be included. Such additive may be exemplified by a variety of solvents, surfactants, silane-based compounds, dielectric substances, crosslinkable compounds, etc.

The step 2 is a step of drying the coating film formed by coating the liquid crystal alignment agent onto a substrate.

In the step of drying the coating film, a method such as heating of a coating film or vacuum evaporation may be used, and the drying may be preferably carried out at 50° C. to 150° C., or at 60° C. to 140° C.

The step 3 is a step of irradiating the coating film with light or rubbing the coating film immediately after the drying step to perform alignment treatment.

In the present disclosure, the "coating film immediately after the drying step" means that light is directly irradiated, after the drying step, without carrying out a heat treatment at a temperature equal to or higher than that of the drying step, and steps other than the heat treatment can be added.

More specifically, when a liquid crystal alignment film is prepared using a conventional liquid crystal alignment agent including polyamic acid or polyamic acid ester, it includes a step of irradiating light after essentially performing a high-temperature heat treatment for imidization of polyamic acid. However, when a liquid crystal alignment film is prepared using the liquid crystal alignment agent of one embodiment described above, it does not include the heat treatment step, but light is directly irradiated to perform alignment treatment, and then the alignment-treated coating film is cured by a heat treatment, thereby preparing a liquid crystal alignment film.

In the alignment treatment step, the light irradiation is performed by irradiating polarized ultraviolet rays having a wavelength of 150 nm to 450 nm. In this case, the intensity of the light exposure may vary depending on the kind of the polymer for a liquid crystal alignment agent, and preferably energy of 10 mJ/cm$^2$ to 10 J/cm$^2$, and more preferably energy of 30 mJ/cm$^2$ to 2 J/cm$^2$, may be irradiated.

As for the ultraviolet rays, the polarized ultraviolet rays selected among the ultraviolet rays subjected to polarization treatment by a method of passing through or reflecting with a polarizing device using a substrate in which a dielectric anisotropic material is coated on the surface of a transparent substrate such as quartz glass, soda lime glass, soda lime-free glass, etc., a polarizer plate on which aluminum or metal wires are finely deposited, or a Brewster's polarizing device by the reflection of quartz glass, etc., are irradiated to perform the alignment treatment. Herein, the polarized ultraviolet rays may be irradiated perpendicularly to the surface of the substrate, or may be irradiated by directing at an angle of incidence toward a specific angle. By this method, the alignment ability of the liquid crystal molecules is imparted to the coating film.

Further, in the alignment treatment step, a rubbing treatment can use a method using a rubbing cloth. More specifically, in the rubbing treatment, the surface of the coating film after the heat treatment step can be rubbed in one direction while rotating a rubbing roller of which a rubbing cloth was attached to a metal roller.

The step 4 is a step of heat-treating and curing the alignment-treated coating film.

The step of heat-treating and curing the alignment-treated coating film is a step that is carried out after the irradiation of light even in the method for preparing a liquid crystal alignment film using a polymer for a liquid crystal alignment agent including a polyamic acid or polyamic acid ester in the past, and is distinguished from the steps of coating the liquid crystal alignment agent onto a substrate and then performing heat treatment for imidizing the liquid crystal alignment agent before irradiating light or while irradiating light.

Herein, the heat treatment may be carried out by a heating means such as a hot plate, a hot air circulation path, an infrared ray furnace, and the like, and the heat treatment is preferably carried out at a temperature of 150° C. to 300° C., or 180° C. to 250° C.

On the other hand, after a step of drying the coating film (step 2), a step of heat-treating the coating film immediately after the drying step at a temperature equal to or higher than that of the drying step can be further included, if necessary. The heat treatment can be performed by a heating means such as a hot plate, a hot air circulation path, an infrared furnace, or the like, and is preferably performed at 150° C. to 250° C. In this process, the liquid crystal alignment agent can be imidized.

That is, the method for producing a liquid crystal alignment film may include the steps of: coating the above-mentioned liquid crystal alignment agent onto a substrate to form a coating film (step 1); drying the coating film (step 2); heat-treating the coating film immediately after the drying step at a temperature equal to or higher than that of the drying step (step 3); irradiating the heat-treated coating film with light or rubbing the coating film to perform alignment treatment (step 4); and heat-treating and curing the alignment-treated coating film (step 5).

On the other hand, according to another embodiment of the invention, a liquid crystal display device including the liquid crystal alignment film described above is provided.

The liquid crystal alignment film may be introduced into a liquid crystal cell by a known method, and likewise, the liquid crystal cell may be introduced into a liquid crystal display device by a known method. The liquid crystal alignment film can be prepared from the polymer including the repeating units of Chemical Formulas 1 to 3 and thus can implement excellent stability together with excellent physical properties.

Accordingly, a liquid crystal display device which can exhibit high reliability may be provided.

Advantageous Effects

According to the present invention, a polymer for a liquid crystal alignment agent having excellent liquid crystal alignment and electrical properties, and a preparation method thereof, can be provided.

DETAILED DESCRIPTION OF THE EMBODIMENTS

Hereinafter, the present invention will be described in more detail in the following examples. However, these examples are provided for the purpose of illustration only, and are not intended to limit the scope of the present invention thereto in any way.

Preparation Examples 1 to 3: Preparation of Diamine

Preparation Example 1

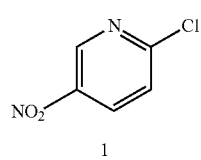

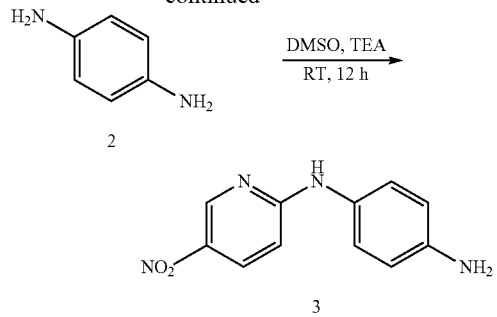

After 18.3 g (100 mmol) of 2-chloro-5-nitropyridine (compound 1) and 12.5 g (98.6 mmol) of para-phenylenediamine (p-PDA, compound 2) were completely dissolved in 200 mL dimethyl sulfoxide (DMSO), 23.4 g (200 mmol) of trimethylamine (TEA) was added thereto and the mixture was stirred at room temperature for 12 hours. When the reaction was completed, the reaction product was charged into a container containing 500 mL of water and stirred for 1 hour. A solid obtained by filtration was washed with 200 mL of water and 200 mL of ethanol to synthesize 16 g (61.3 mmol) of a compound 3 (yield: 60%).

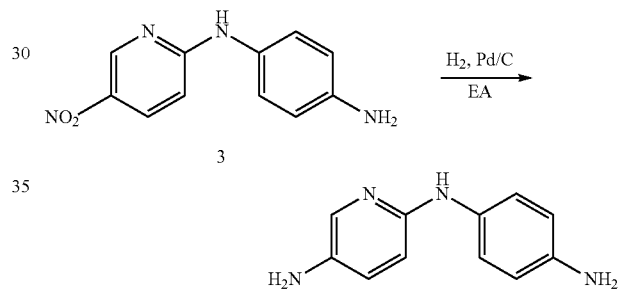

The compound 3 was dissolved in 200 mL of a 1:1 mixed solution of ethyl acetate (EA) and THF, 0.8 g of palladium (Pd)/carbon (C) was added thereto, and the mixture was stirred for 12 hours under a hydrogen atmosphere. After completion of the reaction, the reaction mixture was filtered through a pad of Celite and then concentrated to obtain 11 g of a diamine compound 4 (yield: 89%).

Preparation Example 2

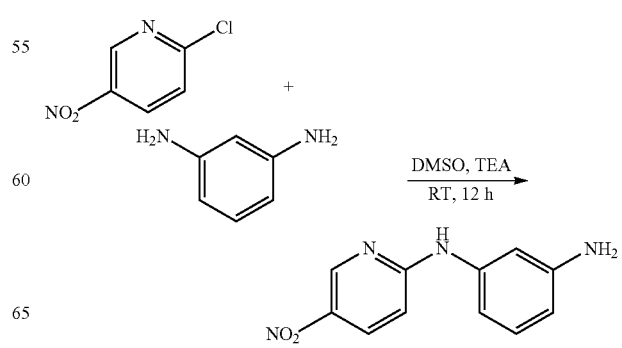

-continued

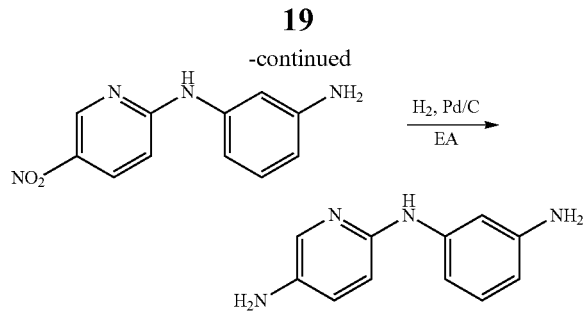

The diamine of Preparation Example 2 was prepared in the same manner as in Preparation Example 1, except that meta-phenylenediamine (m-PDA) was used instead of para-phenylenediamine (p-PDA, compound 2).

Preparation Example 3

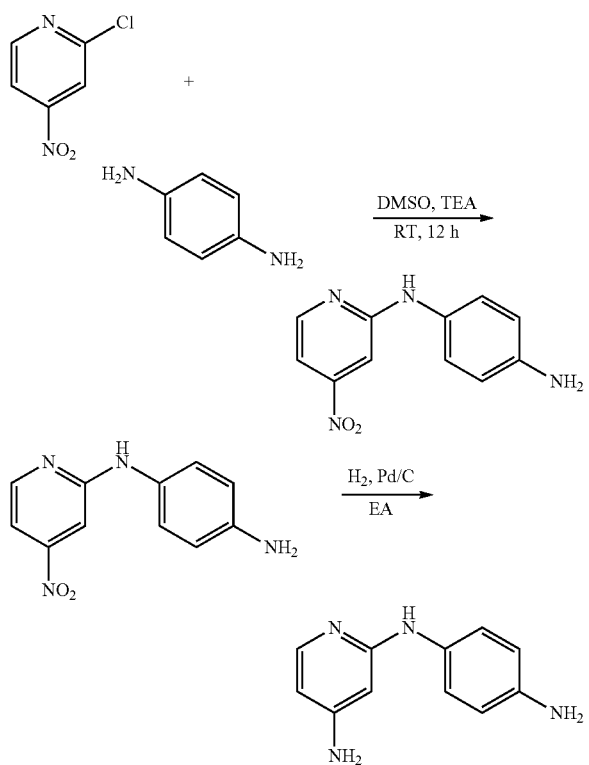

The diamine of Preparation Example 3 was prepared in the same manner as in Preparation Example 1, except that 2-chloro-4-nitropyridine was used instead of 2-chloro-5-nitropyridine (compound 1).

Synthesis Examples and Comparative Synthesis Examples: Synthesis of Polymer for Liquid Crystal Alignment Agent Synthesis Example 1: Polymer P-1 for Liquid Crystal Alignment Agent 19.743 g (0.099 mmol) of the diamine prepared in Preparation Example 1 was completely dissolved in 225.213 g of anhydrous N-methyl pyrrolidone (NMP).

Then, under an ice bath, 20.0 g (0.092 mmol) of pyromellitic dianhydride (PMDA) was added to the solution and stirred at room temperature for 16 hours to prepare a polymer P-1 for a liquid crystal alignment agent. The molecular weight of the polymer P-1 was confirmed by GPC, and as a result, the weight average molecular weight (Mw) was 27,000 g/mol.

Synthesis Example 2: Polymer P-2 for Liquid Crystal Alignment Agent 14.637 g (0.073 mmol) of the diamine prepared in Preparation Example 1 was completely dissolved in 225.213 g of anhydrous N-methyl pyrrolidone (NMP).

Then, under an ice bath, 20.0 g (0.068 mmol) of 3,3',4,4'-biphenyl tetracarboxylic acid dianhydride (BPDA) was added to the solution and stirred at room temperature for 16 hours to prepare a polymer P-2 for a liquid crystal alignment agent. The molecular weight of the polymer P-2 was confirmed by GPC, and as a result, the weight average molecular weight (Mw) was 24,000 g/mol.

Synthesis Example 3: Polymer P-3 for Liquid Crystal Alignment Agent 19.211 g (0.096 mmol) of the diamine prepared in Preparation Example 1 was completely dissolved in 222.194 g of anhydrous N-methyl pyrrolidone (NMP).

Then, under an ice bath, 20.0 g (0.089 mmol) of 1,2,4,5-cyclohexanetetracarboxylic dianhydride (HPMDA) was added to the solution and stirred at room temperature for 16 hours to prepare a polymer P-3 for a liquid crystal alignment agent. The molecular weight of the polymer P-3 was confirmed by GPC, and as a result, the weight average molecular weight (Mw) was 26,500 g/mol.

Synthesis Example 4: Polymer P-4 for Liquid Crystal Alignment Agent 1.974 g (0.01 mmol) of the diamine prepared in Preparation Example 1 and 9.596 g (0.089 mmol) of p-phenylenediamine (p-PDA) were completely dissolved in 178.897 g of anhydrous N-methyl pyrrolidone (NMP).

Then, under an ice bath, 20.0 g (0.092 mmol) of pyromellitic dianhydride (PMDA) was added to the solution and stirred at room temperature for 16 hours to prepare a polymer P-4 for a liquid crystal alignment agent. The molecular weight of the polymer P-4 was confirmed by GPC, and as a result, the weight average molecular weight (Mw) was 24,500 g/mol.

Synthesis Example 5: Polymer P-5 for Liquid Crystal Alignment Agent 9.872 g (0.049 mmol) of the diamine prepared in Preparation Example 1 and 5.331 g (0.049 mmol) of p-phenylenediamine (p-PDA) were completely dissolved in 199.482 g of anhydrous N-methyl pyrrolidone (NMP).

Then, under an ice bath, 20.0 g (0.092 mmol) of pyromellitic dianhydride (PMDA) was added to the solution and stirred at room temperature for 16 hours to prepare a polymer P-5 for a liquid crystal alignment agent. The molecular weight of the polymer P-5 was confirmed by GPC, and as a result, the weight average molecular weight (Mw) was 27,500 g/mol.

Synthesis Example 6: Polymer P-6 for Liquid Crystal Alignment Agent 1.974 g (0.01 mmol) of the diamine prepared in Preparation Example 1 and 17.768 g (0.089 mmol) of 4,4'- oxydianiline (ODA) were completely dissolved in 225.208 g of anhydrous N-methyl pyrrolidone (NMP).

Then, under an ice bath, 20.0 g (0.092 mmol) of pyromellitic dianhydride (PMDA) was added to the solution and stirred at room temperature for 16 hours to prepare a polymer P-6 for a liquid crystal alignment agent. The molecular weight of the polymer P-6 was confirmed by GPC, and as a result, the weight average molecular weight (Mw) was 28,500 g/mol.

Synthesis Example 7: Polymer P-7 for Liquid Crystal Alignment Agent 9.872 g (0.049 mmol) of the diamine prepared in Preparation Example 1 and 9.871 g (0.049 mmol) of 4,4'-oxydianiline (ODA) were completely dissolved in 225.21 g of anhydrous N-methyl pyrrolidone (NMP).

Then, under an ice bath, 20.0 g (0.092 mmol) of pyromellitic dianhydride (PMDA) was added to the solution and stirred at room temperature for 16 hours to prepare a polymer P-7 for a liquid crystal alignment agent. The molecular weight of the polymer P-7 was confirmed by GPC, and as a result, the weight average molecular weight (Mw) was 27,000 g/mol.

Synthesis Example 8: Polymer P-8 for Liquid Crystal Alignment Agent 1.974 g (0.01 mmol) of the diamine prepared in Preparation Example 1 and 17.593 g (0.089 mmol) of 4,4'-methylenedianiline (MDA) were completely dissolved in 224.218 g of anhydrous N-methyl pyrrolidone (NMP).

Then, under an ice bath, 20.0 g (0.092 mmol) of pyromellitic dianhydride (PMDA) was added to the solution and stirred at room temperature for 16 hours to prepare a polymer P-8 for a liquid crystal alignment agent. The molecular weight of the polymer P-8 was confirmed by GPC, and as a result, the weight average molecular weight (Mw) was 29,500 g/mol.

Synthesis Example 9: Polymer P-9 for Liquid Crystal Alignment Agent 9.872 g (0.049 mmol) of the diamine prepared in Preparation Example 1 and 9.774 g (0.049 mmol) of 4,4'-methylenedianiline (MDA) were completely dissolved in 224.66 g of anhydrous N-methyl pyrrolidone (NMP).

Then, under an ice bath, 20.0 g (0.092 mmol) of pyromellitic dianhydride (PMDA) was added to the solution and stirred at room temperature for 16 hours to prepare a polymer P-9 for a liquid crystal alignment agent. The molecular weight of the polymer P-9 was confirmed by GPC, and as a result, the weight average molecular weight (Mw) was 28,000 g/mol.

Synthesis Example 10: Polymer P-10 for Liquid Crystal Alignment Agent 1.464 g (0.007 mmol) of the diamine prepared in Preparation Example 1 and 7.114 g (0.066 mmol) of p-phenylenediamine (p-PDA) were completely dissolved in 161.939 g of anhydrous N-methyl pyrrolidone (NMP).

Then, under an ice bath, 20.0 g (0.068 mmol) of 3,3',4,4'-biphenyl tetracarboxylic acid dianhydride (BPDA) was added to the solution and stirred at room temperature for 16 hours to prepare a polymer P-10 for a liquid crystal alignment agent. The molecular weight of the polymer P-10 was confirmed by GPC, and as a result, the weight average molecular weight (Mw) was 27,500 g/mol.

Synthesis Example 11: Polymer P-11 for Liquid Crystal Alignment Agent 1.464 g (0.007 mmol) of the diamine prepared in Preparation Example 1 and 13.172 g (0.066 mmol) of 4,4'-oxydianiline (ODA) were completely dissolved in 196.272 g of anhydrous N-methyl pyrrolidone (NMP).

Then, under an ice bath, 20.0 g (0.068 mmol) of 3,3',4,4'-biphenyl tetracarboxylic acid dianhydride (BPDA) was added to the solution and stirred at room temperature for 16 hours to prepare a polymer P-11 for a liquid crystal alignment agent. The molecular weight of the polymer P-11 was confirmed by GPC, and as a result, the weight average molecular weight (Mw) was 25,500 g/mol.

Synthesis Example 12: Polymer P-12 for Liquid Crystal Alignment Agent 1.464 g (0.007 mmol) of the diamine prepared in Preparation Example 1 and 13.043 g (0.066 mmol) of 4,4'-methylenedianiline (MDA) were completely dissolved in 195.537 g of anhydrous N-methyl pyrrolidone (NMP).

Then, under an ice bath, 20.0 g (0.068 mmol) of 3,3',4,4'-biphenyl tetracarboxylic acid dianhydride (BPDA) was added to the solution and stirred at room temperature for 16 hours to prepare a polymer P-12 for a liquid crystal alignment agent. The molecular weight of the polymer P-12 was confirmed by GPC, and as a result, the weight average molecular weight (Mw) was 27,000 g/mol.

Synthesis Example 13: Polymer P-13 for Liquid Crystal Alignment Agent 1.921 g (0.01 mmol) of the diamine prepared in Preparation Example 1 and 9.337 g (0.086 mmol) of p-phenylenediamine (p-PDA) were completely dissolved in 177.128 g of anhydrous N-methyl pyrrolidone (NMP).

Then, under an ice bath, 20.0 g (0.089 mmol) of 1,2,4,5-cyclohexanetetracarboxylic dianhydride (HPMDA) was added to the solution and stirred at room temperature for 16 hours to prepare a polymer P-13 for a liquid crystal alignment agent. The molecular weight of the polymer P-13 was confirmed by GPC, and as a result, the weight average molecular weight (Mw) was 23,500 g/mol.

Synthesis Example 14: Polymer P-14 for Liquid Crystal Alignment Agent 1.921 g (0.01 mmol) of the diamine prepared in Preparation Example 1 and 17.289 g (0.086 mmol) of 4,4'-oxydianiline (ODA) were completely dissolved in 222.189 g of anhydrous N-methyl pyrrolidone (NMP).

Then, under an ice bath, 20.0 g (0.089 mmol) of 1,2,4,5-cyclohexanetetracarboxylic dianhydride (HPMDA) was added to the solution and stirred at room temperature for 16 hours to prepare a polymer P-14 for a liquid crystal alignment agent. The molecular weight of the polymer P-14 was confirmed by GPC, and as a result, the weight average molecular weight (Mw) was 26,500 g/mol.

Synthesis Example 15: Polymer P-15 for Liquid Crystal Alignment Agent 1.921 g (0.01 mmol) of the diamine prepared in Preparation Example 1 and 17.119 g (0.086 mmol) of 4,4'- methylenedianiline (MDA) were completely dissolved in 177.128 g of anhydrous N-methyl pyrrolidone (NMP).

Then, under an ice bath, 20.0 g (0.089 mmol) of 1,2,4,5-cyclohexanetetracarboxylic dianhydride (HPMDA) was added to the solution and stirred at room temperature for 16 hours to prepare a polymer P-15 for a liquid crystal alignment agent. The molecular weight of the polymer P-15 was confirmed by GPC, and as a result, the weight average molecular weight (Mw) was 25,000 g/mol.

Synthesis Example 16: Polymer P-16 for Liquid Crystal Alignment Agent 1.974 g (0.01 mmol) of the diamine prepared in Preparation Example 2 and 9.596 g (0.089 mmol) of p-phenylenediamine (p-PDA) were completely dissolved in 178.897 g of anhydrous N-methyl pyrrolidone (NMP).

Then, under an ice bath, 20.0 g (0.092 mmol) of pyromellitic dianhydride (PMDA) was added to the solution and stirred at room temperature for 16 hours to prepare a polymer P-16 for a liquid crystal alignment agent. The molecular weight of the polymer P-16 was confirmed by GPC, and as a result, the weight average molecular weight (Mw) was 22,500 g/mol.

Synthesis Example 17: Polymer P-17 for Liquid Crystal Alignment Agent 1.974 g (0.01 mmol) of the diamine prepared in Preparation Example 2 and 17.768 g (0.089 mmol) of 4,4'-oxydianiline (ODA) were completely dissolved in 225.208 g of anhydrous N-methyl pyrrolidone (NMP).

Then, under an ice bath, 20.0 g (0.092 mmol) of pyromellitic dianhydride (PMDA) was added to the solution and stirred at room temperature for 16 hours to prepare a polymer P-17 for a liquid crystal alignment agent. The molecular weight of the polymer P-17 was confirmed by GPC, and as a result, the weight average molecular weight (Mw) was 24,500 g/mol.

Synthesis Example 18: Polymer P-18 for Liquid Crystal Alignment Agent 1.974 g (0.01 mmol) of the diamine prepared in Preparation Example 2 and 17.593 g (0.089 mmol) of 4,4'-methylenedianiline (MDA) were completely dissolved in 224.218 g of anhydrous N-methyl pyrrolidone (NMP).

Then, under an ice bath, 20.0 g (0.092 mmol) of pyromellitic dianhydride (PMDA) was added to the solution and stirred at room temperature for 16 hours to prepare a polymer P-18 for a liquid crystal alignment agent. The molecular weight of the polymer P-18 was confirmed by GPC, and as a result, the weight average molecular weight (Mw) was 23,000 g/mol.

Synthesis Example 19: Polymer P-19 for Liquid Crystal Alignment Agent 1.974 g (0.01 mmol) of the diamine prepared in Preparation Example 3 and 9.596 g (0.089 mmol) of p-phenylenediamine (p-PDA) were completely dissolved in 178.897 g of anhydrous N-methyl pyrrolidone (NMP).

Then, under an ice bath, 20.0 g (0.092 mmol) of pyromellitic dianhydride (PMDA) was added to the solution and stirred at room temperature for 16 hours to prepare a polymer P-19 for a liquid crystal alignment agent. The molecular weight of the polymer P-19 was confirmed by GPC, and as a result, the weight average molecular weight (Mw) was 21,500 g/mol.

Synthesis Example 20: Polymer P-20 for Liquid Crystal Alignment Agent 1.974 g (0.01 mmol) of the diamine prepared in Preparation Example 3 and 17.768 g (0.089 mmol) of 4,4'-oxydianiline (ODA) were completely dissolved in 225.208 g of anhydrous N-methyl pyrrolidone (NMP).

Then, under an ice bath, 20.0 g (0.092 mmol) of pyromellitic dianhydride (PMDA) was added to the solution and stirred at room temperature for 16 hours to prepare a polymer P-20 for a liquid crystal alignment agent. The molecular weight of the polymer P-20 was confirmed by GPC, and as a result, the weight average molecular weight (Mw) was 24,500 g/mol.

Synthesis Example 21: Polymer P-21 for Liquid Crystal Alignment Agent 1.974 g (0.01 mmol) of the diamine prepared in Preparation Example 3 and 17.593 g (0.089 mmol) of 4,4'-methylenedianiline (MDA) were completely dissolved in 224.218 g of anhydrous N-methyl pyrrolidone (NMP).

Then, under an ice bath, 20.0 g (0.092 mmol) of pyromellitic dianhydride (PMDA) was added to the solution and stirred at room temperature for 16 hours to prepare a polymer P-21 for a liquid crystal alignment agent. The molecular weight of the polymer P-21 was confirmed by GPC, and as a result, the weight average molecular weight (Mw) was 21,000 g/mol.

Synthesis Example 22: Polymer P-22 for Liquid Crystal Alignment Agent 1.921 g (0.01 mmol) of the diamine prepared in Preparation Example 1 and 9.337 g (0.086 mmol) of p-phenylenediamine (p-PDA) were completely dissolved in 177.128 g of anhydrous N-methyl pyrrolidone (NMP).

Then, under an ice bath, 20.0 g (0.089 mmol) of 1,3-dimethyl-cyclobutane-1,2,3,4-tetracarboxylic dianhydride (DMCBDA) was added to the solution and stirred at room temperature for 16 hours to prepare a polymer P-22 for a liquid crystal alignment agent. The molecular weight of the polymer P-22 was confirmed by GPC, and as a result, the weight average molecular weight (Mw) was 20,000 g/mol.

Synthesis Example 23: Polymer P-23 for Liquid Crystal Alignment Agent 19.211 g (0.096 mmol) of the diamine prepared in Preparation Example 1 was completely dissolved in 222.194 g of anhydrous N-methyl pyrrolidone (NMP).

Then, under an ice bath, 20.0 g (0.089 mmol) of 1,3-dimethyl-cyclobutane-1,2,3,4-tetracarboxylic dianhydride (DMCBDA) was added to the solution and stirred at room temperature for 16 hours to prepare a polymer P-23 for a liquid crystal alignment agent. The molecular weight of the polymer P-23 was confirmed by GPC, and as a result, the weight average molecular weight (Mw) was 20,500 g/mol.

Synthesis Example 24: Polymer P-24 for Liquid Crystal Alignment Agent 1.921 g (0.01 mmol) of the diamine prepared in Preparation Example 1 and 17.119 g (0.086 mmol) of 4,4'- methylenedianiline (MDA) were completely dissolved in 221.225 g of anhydrous N-methyl pyrrolidone (NMP).

Then, under an ice bath, 20.0 g (0.089 mmol) of 1,3-dimethyl-cyclobutane-1,2,3,4-tetracarboxylic dianhydride (DMCBDA) was added to the solution and stirred at room temperature for 16 hours to prepare a polymer P-24 for a liquid crystal alignment agent. The molecular weight of the polymer P-24 was confirmed by GPC, and as a result, the weight average molecular weight (Mw) was 22,000 g/mol.

Synthesis Example 25: Polymer P-25 for Liquid Crystal Alignment Agent 1.921 g (0.01 mmol) of the diamine prepared in Preparation Example 1 and 17.119 g (0.086 mmol) of 4,4'-methylenedianiline (MDA) were completely dissolved in 219.696 g of anhydrous N-methyl pyrrolidone (NMP).

Then, under an ice bath, 10.0 g (0.045 mmol) of 1,3-dimethyl-cyclobutane-1,2,3,4-tetracarboxylic dianhydride (DMCBDA) and 9.73 g (0.045 mmol) of pyromellitic dianhydride (PMDA) were added to the solution and stirred at room temperature for 16 hours to prepare a polymer P-25 for a liquid crystal alignment agent. The molecular weight of the polymer P-25 was confirmed by GPC, and as a result, the weight average molecular weight (Mw) was 24,000 g/mol.

Comparative Synthesis Example 1: Polymer R-1 for Liquid Crystal Alignment Agent 26.852 g (0.099 mmol) of p-phenylenediamine (p-PDA) was completely dissolved in 265.496 g of anhydrous N-methyl pyrrolidone (NMP).

Then, under an ice bath, 20.0 g (0.092 mmol) of pyromellitic dianhydride (PMDA) was added to the solution and stirred at room temperature for 16 hours to prepare a polymer R-1 for a liquid crystal alignment agent. The molecular weight of the polymer R-1 was confirmed by GPC, and as a result, the weight average molecular weight (Mw) was 26,000 g/mol.

Comparative Synthesis Example 2: Polymer R-2 for Liquid Crystal Alignment Agent 19.743 g (0.099 mmol) of 4,4'-oxydianiline (ODA) was completely dissolved in 225.208 g of anhydrous N-methyl pyrrolidone (NMP).

Then, under an ice bath, 20.0 g (0.092 mmol) of pyromellitic dianhydride (PMDA) was added to the solution and stirred at room temperature for 16 hours to prepare a polymer R-2 for a liquid crystal alignment agent. The molecular weight of the polymer R-2 was confirmed by GPC, and as a result, the weight average molecular weight (Mw) was 21,000 g/mol.

Comparative Synthesis Example 3: Polymer R-3 for Liquid Crystal Alignment Agent 19.548 g (0.089 mmol) of 4,4'-methylenedianiline (MDA) was completely dissolved in 224.218 g of anhydrous N-methyl pyrrolidone (NMP).

Then, under an ice bath, 20.0 g (0.092 mmol) of pyromellitic dianhydride (PMDA) was added to the solution and stirred at room temperature for 16 hours to prepare a polymer R-3 for a liquid crystal alignment agent. The molecular weight of the polymer R-3 was confirmed by GPC, and as a result, the weight average molecular weight (Mw) was 23,000 g/mol.

Comparative Synthesis Example 4: Polymer R-4 for Liquid Crystal Alignment Agent A polymer R-4 for a liquid crystal alignment agent was prepared in the same manner as in Synthesis Example 1, except that 6-(4-aminophenyl)pyridin-3-amine represented by Chemical Formula A was used instead of the diamine prepared in Preparation Example 1.

[Chemical Formula A]

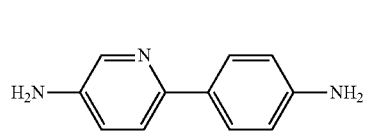

Comparative Synthesis Example 5: Polymer R-5 for Liquid Crystal Alignment Agent A polymer R-5 for a liquid crystal alignment agent was prepared in the same manner as in Synthesis Example 1, except that 4,4'-diaminodiphenylamine represented by Chemical Formula B was used instead of the diamine prepared in Preparation Example 1.

[Chemical Formula B]

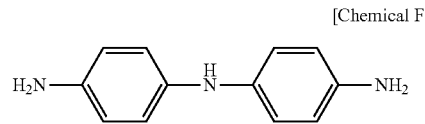

Comparative Synthesis Example 6: Polymer R-6 for Liquid Crystal Alignment Agent A polymer R-6 for a liquid crystal alignment agent was prepared in the same manner as in Synthesis Example 1, except that a compound represented by Chemical Formula C was used instead of the diamine prepared in Preparation Example 1.

[Chemical Formula C]

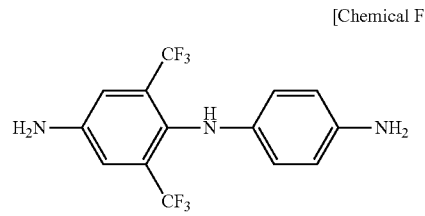

Examples and Comparative Examples: Preparation of Liquid Crystal Alignment Agent

Example 1

20 g of the polymer P-1 for a liquid crystal alignment agent of Synthesis Example 1 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent A-1.

Example 2

20 g of the polymer P-2 for a liquid crystal alignment agent of Synthesis Example 2 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent A-2.

Example 3

20 g of the polymer P-3 for a liquid crystal alignment agent of Synthesis Example 3 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent A-3.

Example 4

20 g of the polymer P-4 for a liquid crystal alignment agent of Synthesis Example 4 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent B-1.

Example 5

20 g of the polymer P-5 for a liquid crystal alignment agent of Synthesis Example 5 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent B-2.

Example 6

20 g of the polymer P-6 for a liquid crystal alignment agent of Synthesis Example 6 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent B-3.

Example 7

20 g of the polymer P-7 for a liquid crystal alignment agent of Synthesis Example 7 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent B-4.

Example 8

20 g of the polymer P-8 for a liquid crystal alignment agent of Synthesis Example 8 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent B-5.

Example 9

20 g of the polymer P-9 for a liquid crystal alignment agent of Synthesis Example 9 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent B-6.

Example 10

20 g of the polymer P-10 for a liquid crystal alignment agent of Synthesis Example 10 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent C-1.

Example 11

20 g of the polymer P-11 for a liquid crystal alignment agent of Synthesis Example 11 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent C-2.

Example 12

20 g of the polymer P-12 for a liquid crystal alignment agent of Synthesis Example 12 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent C-3.

Example 13

20 g of the polymer P-13 for a liquid crystal alignment agent of Synthesis Example 13 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent D-1.

Example 14

20 g of the polymer P-14 for a liquid crystal alignment agent of Synthesis Example 14 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent D-2.

Example 15

20 g of the polymer P-15 for a liquid crystal alignment agent of Synthesis Example 15 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent D-3.

Example 16

20 g of the polymer P-16 for a liquid crystal alignment agent of Synthesis Example 16 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent E-1.

Example 17

20 g of the polymer P-17 for a liquid crystal alignment agent of Synthesis Example 17 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent E-2.

Example 18

20 g of the polymer P-18 for a liquid crystal alignment agent of Synthesis Example 18 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent E-3.

Example 19

20 g of the polymer P-19 for a liquid crystal alignment agent of Synthesis Example 19 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent F-1.

Example 20

20 g of the polymer P-20 for a liquid crystal alignment agent of Synthesis Example 20 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent F-2.

Example 21

20 g of the polymer P-21 for a liquid crystal alignment agent of Synthesis Example 21 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent F-3.

Example 22

20 g of the polymer P-22 for a liquid crystal alignment agent of Synthesis Example 22 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent G-1.

Example 23

20 g of the polymer P-23 for a liquid crystal alignment agent of Synthesis Example 23 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent G-2.

Example 24

20 g of the polymer P-24 for a liquid crystal alignment agent of Synthesis Example 24 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent G-3.

Example 25

20 g of the polymer P-25 for a liquid crystal alignment agent of Synthesis Example 25 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent G-4.

Comparative Example 1

20 g of the polymer R-1 for a liquid crystal alignment agent of Comparative Synthesis Example 1 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent R'-1.

Comparative Example 2

20 g of the polymer R-2 for a liquid crystal alignment agent of Comparative Synthesis Example 2 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent R'-2.

Comparative Example 3

20 g of the polymer R-3 for a liquid crystal alignment agent of Comparative Synthesis Example 3 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent R'-3.

Comparative Example 4

20 g of the polymer R-4 for a liquid crystal alignment agent of Comparative Synthesis Example 4 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent R'-4.

Comparative Example 5

20 g of the polymer R-5 for a liquid crystal alignment agent of Comparative Synthesis Example 5 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent R'-5.

Comparative Example 6

20 g of the polymer R-6 for a liquid crystal alignment agent of Comparative Synthesis Example 6 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent R'-6.

Experimental Examples: Measurement of Physical Properties of Liquid Crystal Alignment Agent Obtained in Examples and Comparative Examples The liquid crystal alignment agent obtained in the examples and comparative examples was used to prepare a liquid crystal cell, and the respective physical properties were measured from the liquid crystal cell by the following method. The results are shown in Table 1 below.

Specifically, the liquid crystal alignment agent obtained in the examples and comparative examples was coated onto the upper and lower substrates for a voltage holding ratio (VHR) in which ITO electrodes with a thickness of 60 nm and an area of 1 cm×1 cm were patterned on a square glass substrate with a size of 2.5 cm×2.7 cm by a spin coating method, respectively. Then, the substrates coated with the liquid crystal alignment agent were placed on a hot plate at about 80° C. and dried for 2 minutes to evaporate the solvent.

Subsequently, the dried upper and lower substrates were baked (cured) in an oven at about 230° C. for 2000 seconds. Thereafter, in order to align the coating film thus obtained, the surface of the coating film was rubbed in one direction while rotating a rubbing roller of which a rubbing cloth was attached to a metal roller.

Then, the alignment-treated upper and lower substrates were baked (cured) in an oven at about 230° C. for 15 minutes to obtain a coating film with a thickness of 0.1 μm. Thereafter, a sealing agent impregnated with ball spacers with a size of 4.5 μm was coated onto the edges of the upper substrate excluding a liquid crystal inlet. The alignment films formed on the upper and lower substrates were then aligned such that they faced each other and the alignment directions were aligned with each other, and the upper and lower substrates were bonded together and the sealing agent was cured with UV and heat to prepare an empty cell. Then, a liquid crystal was injected into the empty cells, and the inlet was sealed with a sealing agent to prepare a liquid crystal alignment cell.

1. Voltage Holding Ratio (VHR)

The voltage holding ratio of the liquid crystal alignment cell was measured at 1 Hz and 60° C. using 6254 C equipment manufactured by TOYO Corporation as a measuring instrument.

2. AC Afterimage

Polarizing plates were attached to the upper and lower substrate plates of the liquid crystal alignment cell so as to be perpendicular to each other. The polarizing plate-attached liquid crystal alignment cell was attached on a backlight having luminance of 7000 cd/cm$^2$, and the luminance in a black state was measured using a luminance or brightness measuring instrument PR-880. Then, the liquid crystal cell was operated at room temperature with an alternating voltage of 5 V for 24 hours. Thereafter, in the voltage-off state of the liquid crystal cell, luminance in the black state was measured as described above. A difference between the initial luminance (L0) measured before operation of the liquid crystal cell and the later luminance (L1) measured after operation was divided by the initial luminance (L0), and then multiplied by 100 to calculate a luminance fluctuation rate. When the calculated luminance fluctuation rate is close to 0%, it means that the alignment stability is excellent. Through the measurement results of the luminance fluctuation rate, the afterimage level was evaluated under the following criteria.

Excellent: when luminance fluctuation rate is less than 10%

Ordinary: when luminance fluctuation rate is between 10% and 20%.

3. Imidization Rate (%)

The FT-IR spectrum of the liquid crystal alignment films obtained from the liquid crystal alignment agents of Examples 1 and 2, and Comparative Examples 4, 5, and 6 was measured by an ATR method, and the ratio of imide structure in the polymer molecules contained in the alignment film was measured.

TABLE 1

Measurement results of experimental examples of examples and comparative examples

| Class | Polymer | Diamine (molar ratio) | Dicarboxylic acid | VHR (%) | AC afterimage (%) | Imidization rate (%) |
|---|---|---|---|---|---|---|
| Example 1 | P-1 | Preparation Example 1 | PMDA | 91 | Excellent | 91 |
| Example 2 | P-2 | Preparation Example 1 | BPDA | 90 | Excellent | 89 |
| Example 3 | P-3 | Preparation Example 1 | HPMDA | 92 | Excellent | — |
| Example 4 | P-4 | Preparation Example 1, p-PDA (10:89) | PMDA | 86 | Excellent | — |
| Example 5 | P-5 | Preparation Example 1, p-PDA (1:1) | PMDA | 87 | Ordinary | — |
| Example 6 | P-6 | Preparation Example 1, ODA (10:89) | PMDA | 87 | Excellent | — |
| Example 7 | P-7 | Preparation Example 1, ODA (1:1) | PMDA | 88 | Ordinary | — |
| Example 8 | P-8 | Preparation Example 1, MDA (10:89) | PMDA | 90 | Excellent | — |
| Example 9 | P-9 | Preparation Example 1, MDA (1:1) | PMDA | 91 | Ordinary | — |
| Example 10 | P-10 | Preparation Example 1, p-PDA (7:66) | BPDA | 87 | Excellent | — |
| Example 11 | P-11 | Preparation Example 1, ODA (7:66) | BPDA | 90 | Excellent | — |
| Example 12 | P-12 | Preparation Example 1, MDA (7:66) | BPDA | 90 | Excellent | — |
| Example 13 | P-13 | Preparation Example 1, p-PDA (10:86) | HPMDA | 91 | Ordinary | — |
| Example 14 | P-14 | Preparation Example 1, ODA (10:86) | HPMDA | 90 | Ordinary | — |
| Example 15 | P-15 | Preparation Example 1, MDA (10:86) | HPMDA | 91 | Ordinary | — |
| Example 16 | P-16 | Preparation Example 2, p-PDA (10:89) | PMDA | 85 | Ordinary | — |
| Example 17 | P-17 | Preparation Example 2, ODA (10:89) | PMDA | 87 | Ordinary | — |
| Example 18 | P-18 | Preparation Example 2, MDA (10:89) | PMDA | 88 | Ordinary | — |
| Example 19 | P-19 | Preparation Example 3, p-PDA (10:89) | PMDA | 84 | Ordinary | — |
| Example 20 | P-20 | Preparation Example 3, ODA (10:89) | PMDA | 86 | Ordinary | — |
| Example 21 | P-21 | Preparation Example 3, MDA (10:89) | PMDA | 86 | Ordinary | — |

TABLE 1-continued

Measurement results of experimental examples of examples and comparative examples

| Class | Polymer | Diamine (molar ratio) | Dicarboxylic acid | VHR (%) | AC afterimage (%) | Imidization rate (%) |
|---|---|---|---|---|---|---|
| Example 22 | P-22 | Preparation Example 1, p-PDA (10:86) | DMCBDA | 83 | Excellent | — |
| Example 23 | P-23 | Preparation Example 1 | DMCBDA | 81 | Excellent | — |
| Example 24 | P-24 | Preparation Example 1, MDA (10:86) | DMCBDA | 81 | Excellent | — |
| Example 25 | P-25 | Preparation Example 1, MDA (10:86) | DMCBDA, PMDA (45:45) | 78 | Excellent | — |
| Comparative Example 1 | R-1 | p-PDA | PMDA | 55 | Ordinary | — |
| Comparative Example 2 | R-2 | ODA | PMDA | 63 | Ordinary | — |
| Comparative Example 3 | R-3 | MDA | PMDA | 64 | Ordinary | — |
| Comparative Example 4 | R-4 | Formula A | PMDA | 67 | Poor | 70 |
| Comparative Example 5 | R-5 | Formula B | PMDA | 73 | Ordinary | 79 |
| Comparative Example 6 | R-6 | Formula C | PMDA | 53 | Poor | 73 |

As shown in Table 1, as the liquid crystal alignment agent of the examples contains a polymer produced from a reaction product containing a diamine having an asymmetric structure as in Preparation Examples 1 to 3, the voltage holding ratio (VHR) is improved to as high as 80% or more, and the AC afterimage can be maintained at the equivalent level or more.

Particularly, in the case of the liquid crystal alignment agents of Examples 22 to 25, the voltage holding ratio (VHR) is improved and also the luminance fluctuation rate is measured to be less than 10%, which confirms that the AC afterimage properties are remarkably improved.

On the other hand, in the case of the liquid crystal alignment agents of the comparative examples, since the diamine having an asymmetric structure as in Preparation Examples 1 to 3 are not contained in the reaction product during the production of the polymer, it is confirmed that it exhibits a voltage holding ratio (VHR) of 55% to 73% which is significantly lower than that of the examples, and the luminance fluctuation rate increases from 10% to 20%, and thus AC afterimage properties are poor.

In particular, the liquid crystal alignment agents obtained in Comparative Examples 4 to 6 exhibit the imidization rate of less than 80% at 230° C., and thus the imidization level is lower than that of the examples showing an imidization rate of 89% or more.

The invention claimed is:

1. A liquid crystal alignment film comprising a liquid crystal alignment agent comprising a copolymer comprising two or more repeating units selected from the group consisting of a repeating unit represented by Chemical Formula 1, a repeating unit represented by Chemical Formula 2 and a repeating unit represented by Chemical Formula 3:

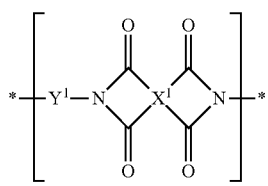

[Chemical Formula 1]

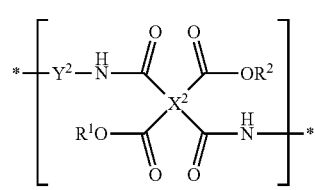

[Chemical Formula 2]

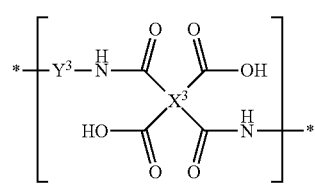

[Chemical Formula 3]

wherein, in Chemical Formulae 1 to 3, at least one of $R^1$ and $R^2$ is an alkyl group having 1 to 10 carbon atoms, and the other is hydrogen, $X^1$ to $X^3$ are each independently a tetravalent organic group, represented by Chemical Formula 5:

[Chemical Formula 5]

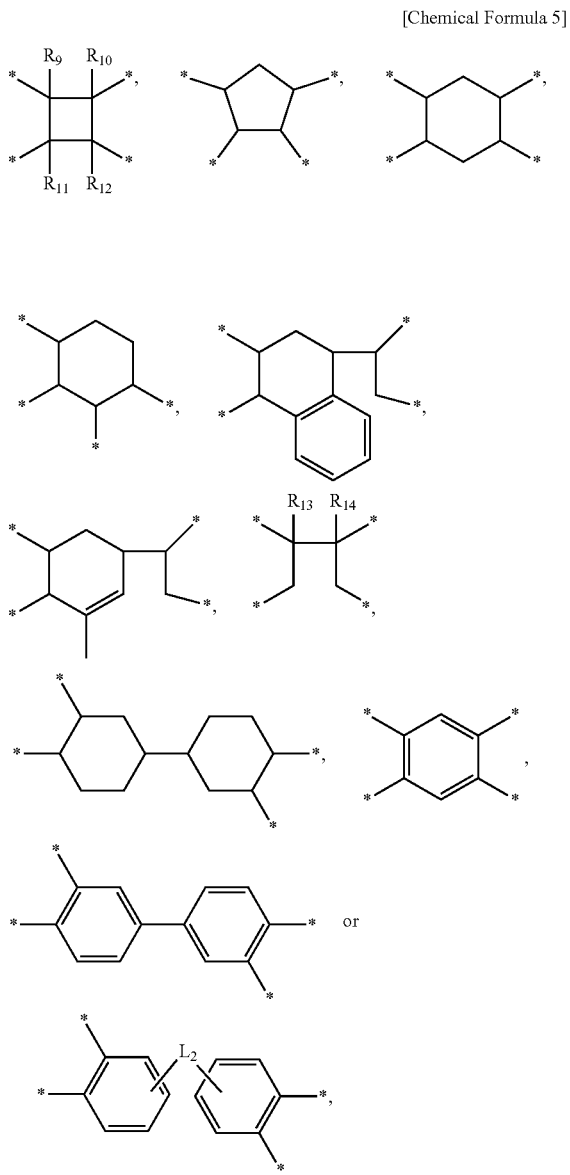

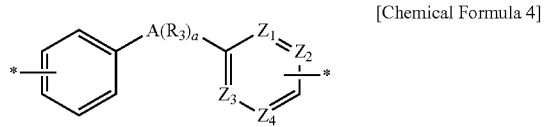

[Chemical Formula 4]

wherein, in Chemical Formula 4,
A is nitrogen, phosphorus, arsenic, antimony or bismuth,
$R_3$ is hydrogen or an alkyl group having 1 to 10 carbon atoms,
a is an integer of 1 to 3, and
one of $Z_1$ and $Z_3$ is nitrogen, the other is carbon, and $Z_2$ and $Z_4$ are carbon,
wherein, $Y^1$ of the repeating unit represented by Chemical Formula 1 is connected to an adjacent repeating unit represented by Chemical Formula 1 as —N—$Y^1$—N—, or to an adjacent repeating unit represented by Chemical Formula 2 or 3 as —HN—$Y^1$—N—; $Y^2$ of the repeating unit represented by Chemical Formula 2 is connected to an adjacent repeating unit represented by Chemical Formula 2 or 3 as —HN—$Y^2$—NH—, or to an adjacent repeating unit represented by Chemical Formula 1 as —N—$Y^2$—NH—; and $Y^3$ of the repeating unit represented by Chemical Formula 3 is connected to an adjacent repeating unit represented by Chemical Formula 2 or 3 as —NH—$Y^3$—NH— or to an adjacent repeating unit represented by Chemical Formula 1 as —N—$Y^3$—NH—, and
wherein the liquid crystal alignment film is prepared by an alignment treatment including irradiating with polarized light or rubbing in one direction, without preceding or concurrent curing, prior to a curing heat treatment.

2. The liquid crystal alignment film according to claim 1, wherein in the Chemical Formula 4, A is nitrogen, $R_3$ is hydrogen, and a is 1.

3. The liquid crystal alignment film according to claim 1, wherein the Chemical Formula 4 includes one or more divalent organic groups selected from the group consisting of Chemical Formulae 4-1, 4-2, and 4-3:

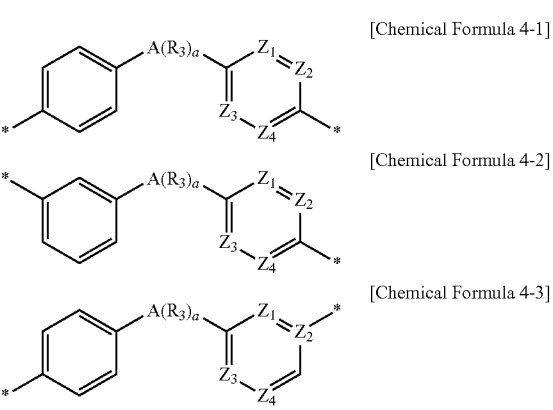

wherein, A, $R_3$, a, $Z_1$, $Z_2$, $Z_3$, and $Z_4$ are as defined in Chemical Formula 4.

4. The liquid crystal alignment film according to claim 1, wherein the copolymer further comprises one or more repeating units selected from the group consisting of a repeating unit represented by Chemical Formula 11, a wherein, in Chemical Formula 5,
$R_9$ to $R_{14}$ are each independently hydrogen or an alkyl group having 1 to 10 carbon atoms,
$L_2$ is any one selected from the group consisting of a direct bond, —O—, —CO—, —S—, —SO—, —SO$_2$—, —CR$_{15}$R$_{16}$—, —CONH—, —COO—, —(CH$_2$)$_b$—, —O(CH$_2$)$_b$O—, —COO—(CH$_2$)$_b$—OCO—, phenylene, or a combination thereof,
$R_{15}$ and $R_{16}$ are each independently hydrogen, an alkyl group having 1 to 10 carbon atoms, or a fluoroalkyl group having 1 to 10 carbon atoms, and b is an integer of 1 to 10, and
$Y^1$ to $Y^3$ are each independently a divalent organic group represented by the following Chemical Formula 4:

repeating unit represented by Chemical Formula 12, and a repeating unit represented by Chemical Formula 13:

[Chemical Formula 11]

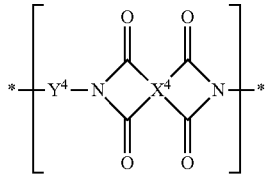

[Chemical Formula 12]

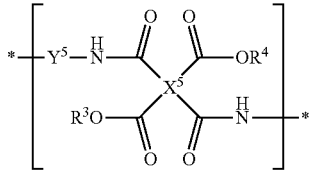

[Chemical Formula 13]

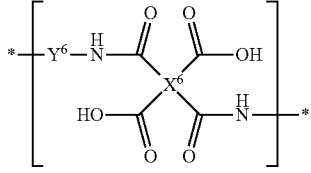

wherein, in Chemical Formulae 11 to 13,
at least one of $R^3$ and $R^4$ is an alkyl group having 1 to 10 carbon atoms and the other is hydrogen,
$X^4$ to $X^6$ are each independently a tetravalent organic group, and
$Y^4$ to $Y^6$ are each independently a divalent organic group represented by Chemical Formula 14:

[Chemical Formula 14]

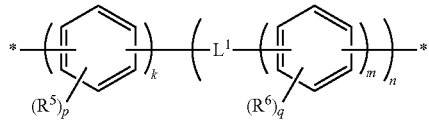

wherein, in Chemical Formula 14,
$R^5$ and $R^6$ are each independently hydrogen, a halogen, a cyano, a $C_{1-10}$ alkyl, a $C_{2-10}$ alkenyl, a $C_{1-10}$ alkoxy, a $C_{1-10}$ fluoroalkyl, or a $C_{1-10}$ fluoroalkoxy,
p and q are each independently an integer of 0 to 4,
$L^1$ is a single bond, —O—, —CO—, —S—, —SO$_2$—, —C(CH$_3$)$_2$—, —C(CF$_3$)$_2$—, —CONH—, —COO—, —(CH$_2$)$_z$—, —O(CH$_2$)$_z$O—, —O(CH$_2$)$_z$—, —NH—, —NH(CH$_2$)$_z$—NH—, —NH(CH$_2$)$_z$O—, —OCH$_2$—C(CH$_3$)$_2$—CH$_2$O—, —COO—(CH$_2$)$_z$—OCO—, or —OCO—(CH$_2$)$_z$—COO—,
Z is an integer of 1 to 10,
k and m are each independently an integer of 0 to 3, and
n is an integer of 0 to 3
when n=0, k is 1 to 3, and when k=0, m and n are each independently 1 to 3.

5. The liquid crystal alignment film according to claim 4, wherein the Chemical Formula 14 is represented by Chemical Formula 15 or Chemical Formula 16:

[Chemical Formula 15]

[Chemical Formula 16]

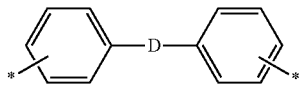

wherein, in Chemical Formula 16,
D is a direct bond, O, SO$_2$, or C(R$_7$)(R$_8$), wherein R$_7$ and R$_8$ are each independently hydrogen, or an alkyl group having 1 to 10 carbon atoms.

6. A liquid crystal display device comprising the liquid crystal alignment film of claim 4.

7. The liquid crystal alignment film according to claim 1, wherein the copolymer has a weight average molecular weight of 1000 g/mol to 200,000 g/mol.

8. A liquid crystal display device comprising the liquid crystal alignment film of claim 1.

* * * * *